US 8,312,531 B2

(12) United States Patent
Walter et al.

(10) Patent No.: US 8,312,531 B2
(45) Date of Patent: Nov. 13, 2012

(54) COMMUNICATING VIA A WIRELESS GATEWAY DEVICE AND SSL

(75) Inventors: Edward Walter, Boerne, TX (US); Michael Raftelis, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 862 days.

(21) Appl. No.: 12/351,146

(22) Filed: Jan. 9, 2009

(65) Prior Publication Data

US 2010/0177896 A1 Jul. 15, 2010

(51) Int. Cl.
*G06F 9/00* (2006.01)
(52) U.S. Cl. ............ 726/14; 726/15; 380/270; 709/229; 713/158
(58) Field of Classification Search .................. 380/270; 709/229; 726/14, 15; 713/153
See application file for complete search history.

(56) References Cited

U.S. PATENT DOCUMENTS

| 7,624,438 | B2* | 11/2009 | White et al. ..................... 726/15 |
| 7,769,868 | B2* | 8/2010 | Mishra et al. ................. 709/227 |
| 7,913,902 | B2* | 3/2011 | Isaacson ....................... 235/380 |
| 7,926,098 | B2* | 4/2011 | Chinitz et al. .................. 726/12 |
| 8,077,681 | B2* | 12/2011 | Ahmavaara et al. .......... 370/338 |
| 2007/0255840 | A1* | 11/2007 | Jones et al. ................... 709/229 |

* cited by examiner

*Primary Examiner* — Carl Colin
*Assistant Examiner* — Ali Shayanfar
(74) *Attorney, Agent, or Firm* — Turocy & Watson, LLP

(57) ABSTRACT

Systems (and corresponding methodologies) of deploying an enhanced access point (or an integrated router/access point) with embedded secure socket layer (SSL) tunneling capabilities are provided. The innovation enables users to initiate or prompt secure SSL tunnels between a wireless computer or device (and browser session) and the wireless gateway device (WGD). In particular, off-the-shelf web browser applications can be used to effect secure communication between a wireless mobile device and a SWAT-(Secure Wireless Application Tunnel-) equipped access point.

20 Claims, 10 Drawing Sheets

COMMUNICATING VIA A WIRELESS GATEWAY DEVICE AND SSL

BACKGROUND

The Internet continues to make available ever-increasing amounts of information which can be stored in databases and accessed therefrom. With the proliferation of portable terminals and wireless devices (e.g., smartphones, cellular telephones, personal data assistants (PDAs), and other similar communication devices), users are becoming more mobile, and hence, more reliant upon information accessible via the Internet.

In addition to using mobile terminals for standard voice communications and Internet access, more and more users are transmitting and receiving sensitive information. This information exchange should be protected against malicious, unwanted or accidental interception. Many wireless protocols are capable of some form of secure data transmission. However, unfortunately, these options are increasingly complex for an end user who wishes to transmit protected wireless communications via a mobile device.

One popular wireless local area network (WLAN) communications protocol is the IEEE (Institute of Electrical and Electronics Engineers) 802.11 set of standards. This wireless communication protocol (Wi-Fi) encompasses a set of wireless LAN/WLAN standards developed by the IEEE LAN/MAN Standards committee. The 802.11 family currently includes six over-the-air modulation techniques that all use the same protocol. The most popular techniques are those defined by the 'a,' 'b,' and 'g' amendments to the original standard.

Wireless communication allows for "networked" communication across the wireless spectrum with no requirement for a "wired" connection. This freedom allows ease of use and mobility for the user. A user can connect to any WGD (wireless gateway device) or AP (access point) that allows the connection, for example, based upon authentication and authorization techniques. Thereafter, the user can quickly download (or transmit) content from a favorite website. Unfortunately, this access comes with increased security risk.

Conventionally, dealing with this risk was an all or nothing option. In other words, a user had an option to connect and send data back and forth between the WGD in the clear or without any protection at all. Here, there was no protection from a malicious user that is monitoring a user's access to the wireless spectrum. On the other hand, another option was to enable complex configurations through various security protocols. This option was expensive both in monetary as well as processing cost.

Conventional security protocols used in wireless transmission include Wired Equivalent Privacy (WEP) which was intended to provide comparable confidentiality to a traditional wired network. In particular, WEP does not protect users of the network from each other, hence the name. Several serious weaknesses were identified, for example, today, most any WEP key can be cracked with readily-available software in two minutes or less.

WEP was superseded by Wi-Fi Protected Access (WPA) in 2003, and then by the full IEEE 802.11(i) standard, also known as WPA2 in 2004. Most often, these security protocols were only used by corporate and home networks. Hotspots, Internet cafes, hotels, multiple dwelling units and other places providing wireless Internet access usually do not provide any security of the wireless connection. The complexity involved in configuration of the WEP/WPA settings and compatibility issues dictates a more simplified configuration.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems (and corresponding methodologies) of deploying an access point (or an integrated router/access point) with embedded secure socket layer (SSL) tunneling capabilities. The systems enable users to initiate secure SSL tunnels between a wireless computer or device (and browser session) and the wireless gateway device (WGD).

One benefit is a secure connection from the WGD to the wireless device without complexity to the user or device processor expense. Most any device (PDA (personal digital assistant), PC (personal computer), laptop, cell phone, smartphone . . . with a browser (e.g., IE (Internet Explorer), Firefox . . . ) could be used to securely access the Internet or other desired network.

In another embodiment, this SSL tunnel could terminate on an enhanced (SSL-capable) Ethernet switch or router, for example, in effect, passing-through the access point or a WGD to terminate the secure tunnel with the router or switch device. Within this embodiment the secure tunnel is extended further. Also, in another embodiment, a secure VPN tunnel could be established but would add complexity to the user.

In yet another aspect thereof, a machine learning & reasoning (MLR) component is provided that employs a probabilistic and/or statistical-based analysis to prognose or infer an action that a user desires to be automatically performed. For example, the MLR can be employed to automatically select secure transmission (e.g., SSL) based upon context of transmission, type of data traffic, etc.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
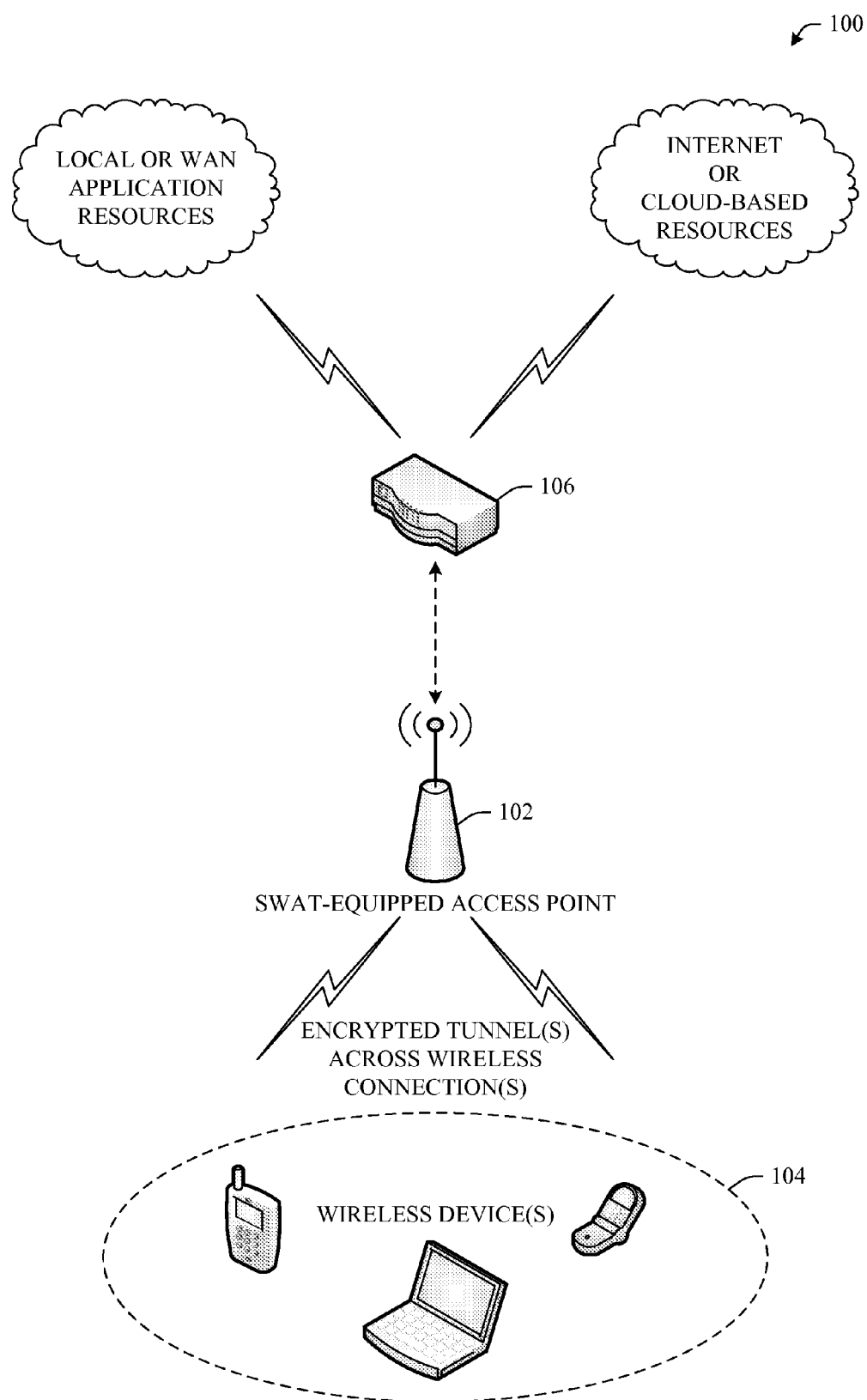
FIG. 1 illustrates an example system that employs a tunnel-capable access point (AP) to secure wireless communications in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA (personal digital assistant), mobile telephone, or other suitable device, for example) where the layout and information or content to be displayed on the page is stored in memory, database, or another storage facility.

Referring initially to the drawings, FIG. 1 illustrates an example system 100 that enables secure data transmission across wireless networks. Generally, the system 100 deploys a secure wireless application tunnel or SWAT-equipped access point (AP) or an integrated router/access point with embedded Secure Socket Layer (SSL) tunneling capabilities. In operation, this enhanced AP enables users to initiate SSL tunnels between a wireless computer (and browser session) 104 and the Wireless Gateway Device (WGD) (e.g., AP 102). As shown, the AP 102 can be used in conjunction with a router or switch 106 to access resources such as, local, wide area network (WAN), Internet or cloud-based resources. In other aspects, all or a portion of the functionality of the AP 102 and router 106 can be integrated into a single component (not shown) in order to effect secure wireless access to resources.

One benefit is a secure connection from the WGD 102 to the wireless device 104 without complexity to the user. Most any wireless device 104, for example a PDA, personal computer (PC), laptop computer, cell phone, smartphone, etc. with a browser application (e.g., IE (Internet Explorer), Firefox . . . ) can be used to securely access the Internet or other network-accessible resources.

In another embodiment, the SSL tunnel could terminate on an enhanced (SSL-equipped) Ethernet switch or router 106. This extended termination, in effect, enables the tunnel to pass-through the AP or a WGD 102 to terminate the secure tunnel with the router or switch device 106. In yet another embodiment, a secure VPN (virtual private network) tunnel could be established. However, it is to be appreciated that the optional VPN tunnel embodiment would most likely add complexity to the user.

Figure 2:
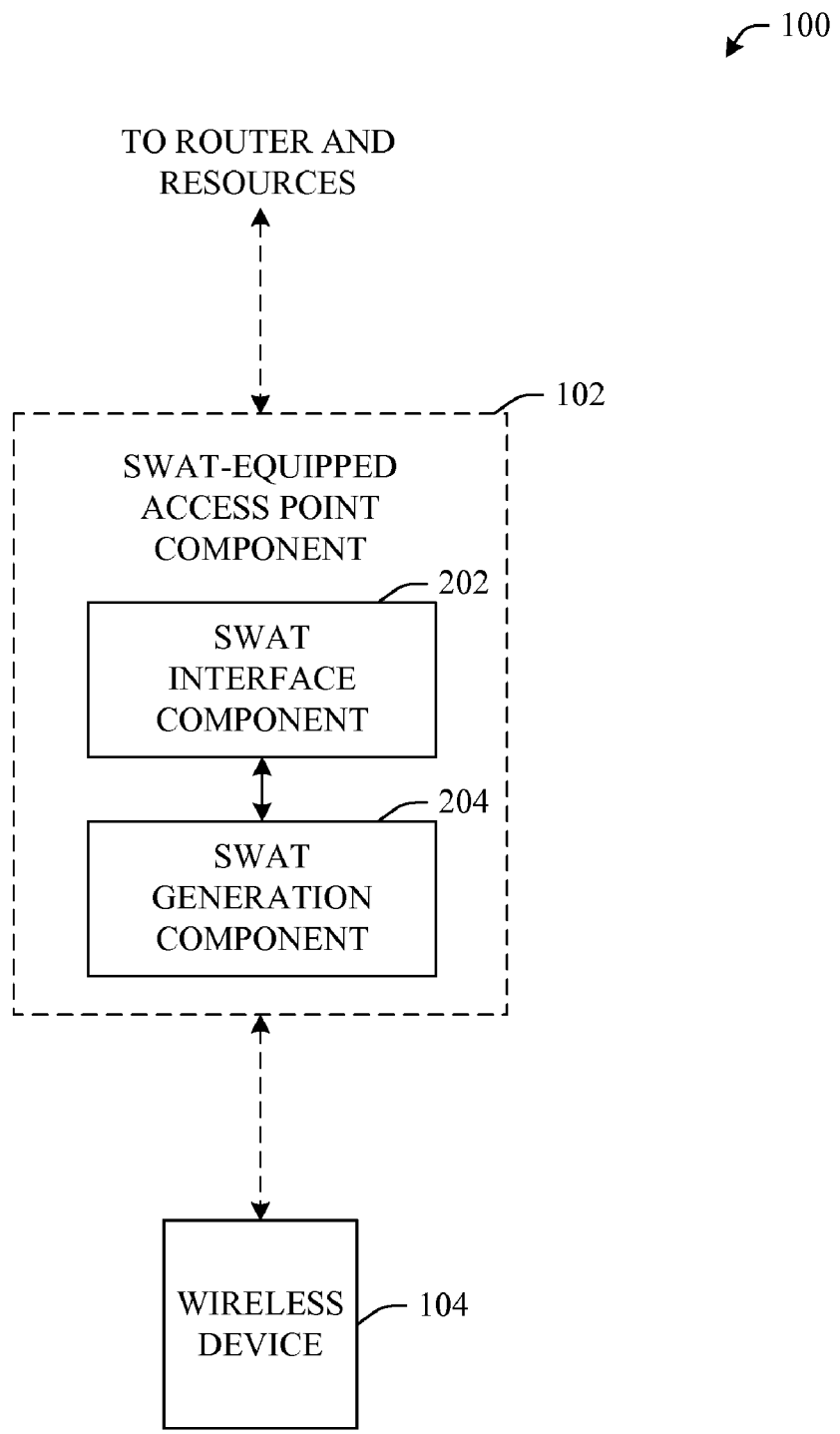
FIG. 2 illustrates an example block diagram of a secure wireless application tunnel (SWAT) equipped AP in accordance with an aspect of the innovation.

FIG. 2 illustrates an example block diagram of system 100 in accordance with aspects of the innovation. As shown, the SWAT-equipped AP component 102 can include a SWAT interface component 202 and a SWAT generation component 204. Together, these sub-components (202, 204) enable a user to select when and if a SSL or other secure tunnel transmission is desired or appropriate.

The SWAT-equipped AP 102 reduces complexity for an end user attempting to securely communicate between a wireless device 104 and a network via a wireless medium. More particularly, the WGD or AP 102 reduces the overhead and additional applications required on an end user's wireless device 104 to communicate via a secure wireless connection. As described herein, a user can selectively establish a secure tunnel by way of a browser application by which traffic can be transmitted.

In accordance with the innovation described herein, the user of the wireless device 106 need not configure the option. Rather, in accordance with the innovation, the complexity of configuration is removed to secure a connection from a SWAT-enabled WGD 102 and the wireless user. As a result, no special or custom application(s) is required to be installed upon the wireless device 104. In operation, a standard or off-the-shelf web browser is leveraged to enable secure communications from the wireless connected computer or device 104 and the WGD 102.

Figure 3:
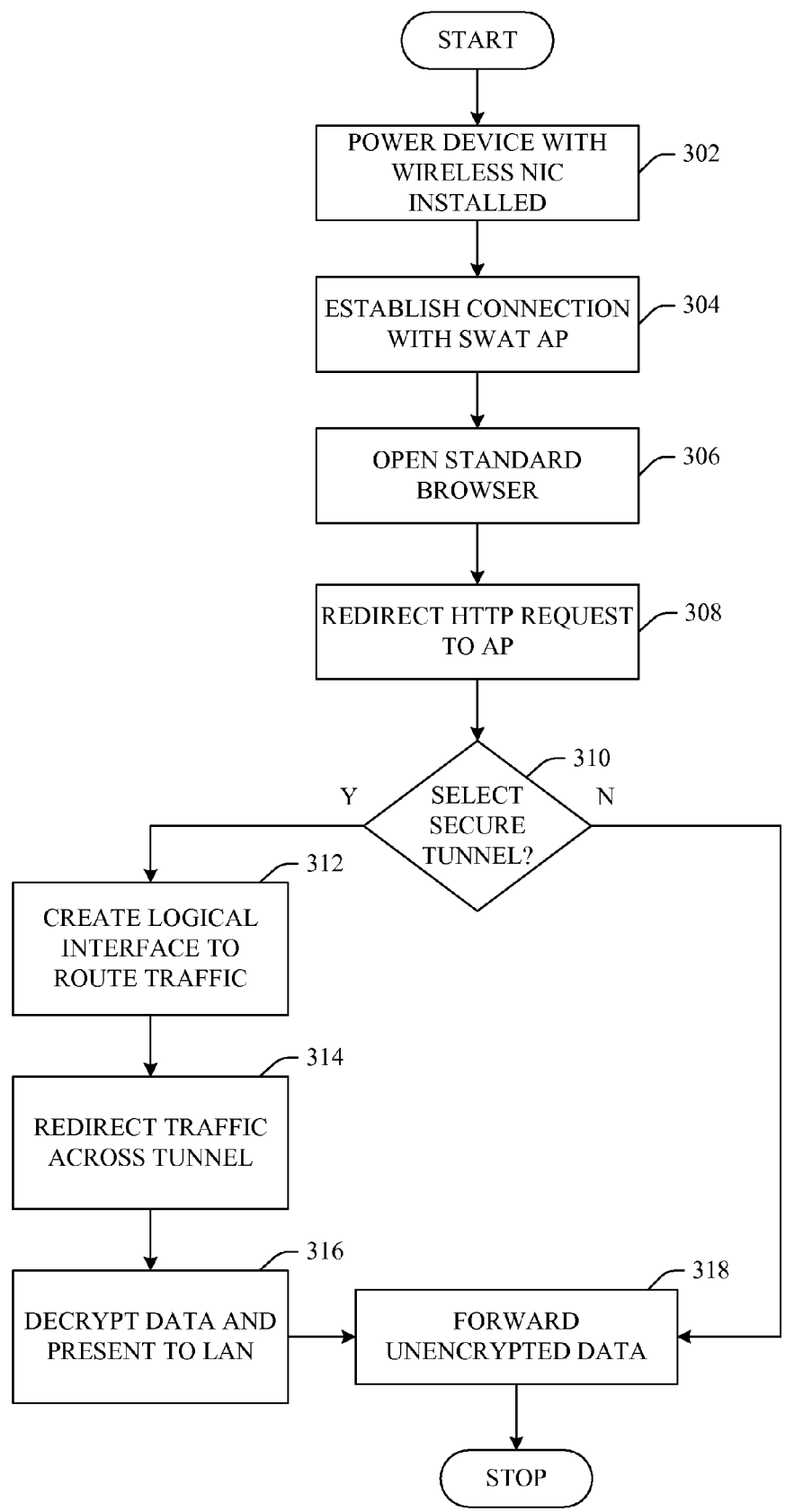
FIG. 3 illustrates an example flow chart of procedures that facilitate initiating access to a SWAT-equipped AP in accordance with an aspect of the innovation.

FIG. 3 illustrates a methodology of initiating access to a SWAT-capable access point (e.g., WGD 102 of FIG. 1) in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As shown in FIG. 3, an example process that a user would employ to initiate access to a SWAT-equipped WGD is shown. At 302, a device with a wireless NIC (network interface card), or other wireless connectivity, can be powered up. Thereafter, at 304, the device will identify a WGD such as the SWAT-equipped AP 102 of FIG. 1. It will be understood that connectivity (and authentication) to the AP can be established in most any suitable manner. During this act, the wireless device can display connectivity to the WGD.

Next, at 306, a standard web page or off-the-shelf browser can be opened. It is to be understood and appreciated that the web page or browser page can be an Internet or other cloud-based resource. Additionally, the resource can be a local (e.g., intranet) or other wide area network (WAN) resource.

As the user attempts to access a predefined webpage, at 308, the messages (e.g., HTTP (hypertext transfer protocol) messages) are redirected to an instance of a web server session on the WGD. Here an interface or splash screen/page can be displayed for the user to select if they desire secure tunnel communications. Examples of these display screens are illustrated and will be described with reference to FIGS. 4A and 4B which follow.

A determination is made at 310 to establish if the user desires to employ a secure tunnel for communications. As shown, if the user selects to create a tunnel by checking the appropriate box (or other designated method), a secure tunnel between the wireless device and the WGD (or router/switch if extended) is configured. In particular, at 312, a logical interface can be created to route the traffic. At 314, network traffic between the wireless device and the AP or WGD is redirected across the tunnel, for example, an SSL tunnel.

As data traffic transmitted across the tunnel is encrypted, e.g., using a signed certificate, at 316, the data is decrypted and presented to a local area network (LAN) in a native unencrypted format. Here, in one aspect, the AP can perform the decryption. In other aspects, a router or switch can perform the decryption. Thereafter, at 318, the unencrypted data can be forwarded to the appropriate URL (uniform resource locator), IP (Internet Protocol) address, or other appropriate source. As shown in FIG. 3, if a user selects to bypass or pass-through without tunneling, a standard connection is made without secure tunneling. In other words, the unsecured traffic is forwarded to the appropriate URL or IP address as shown in 318.

Figure 4A:
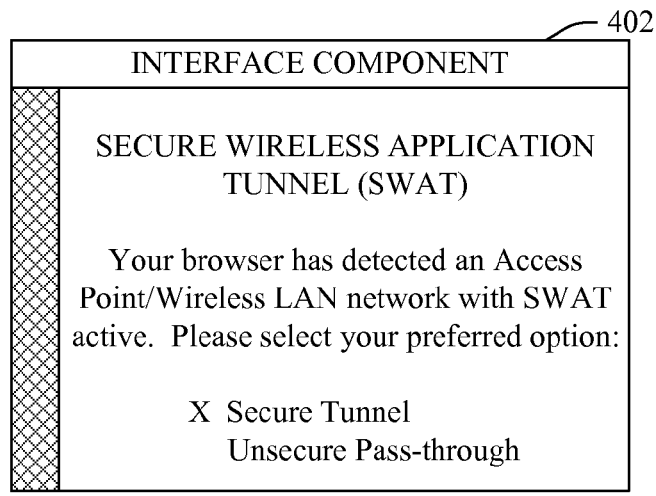
FIGS. 4A-4B illustrate example user interface screens that facilitate activation and deactivation of tunneling capabilities in accordance with aspects of the innovation.
Figure 4B:
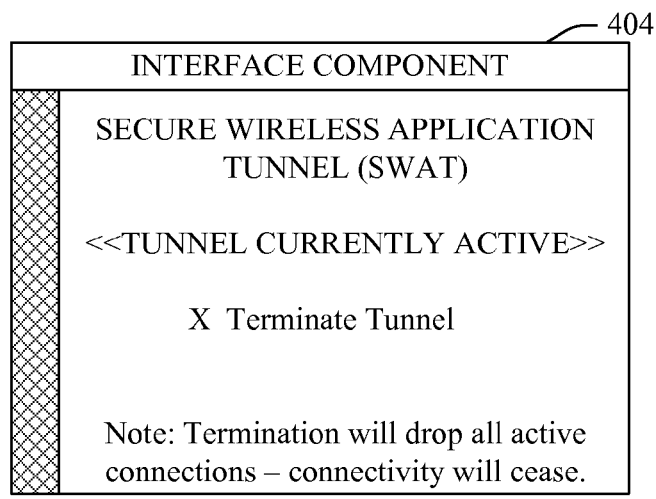

As described with reference to FIG. 3, the system can present the user with an interface or splash screen/page by which tunnel-effected communications can be selected. Example splash screens are shown in FIGS. 4A and 4B. Referring first to the example of FIG. 4A, here, SWAT access can be selected by checking or otherwise selecting the appropriate option. As illustrated, a user can select the "Secure Tunnel" option which triggers establishment of an SSL tunnel for traffic communications. Similarly, the user can select "Unsecure Pass-through" which effectively permits unsecure (e.g., non-SSL) communications.

As shown in FIG. 4B, if SWAT is currently active, the interface component 404 can convey "<<TUNNEL CURRENTLY ACTIVE>>"—here, the user can opt to continue or terminate the tunnel. As shown on the example interface splash page, termination of the tunnel will drop all active connections to the network or Internet. As a result, connectivity ceases.

In other words, FIG. 4A illustrates an initial splash screen that is rendered when a user attempts to connect to a WGD that is running SWAT or the Secure Wireless Application Tunnel. It is to be understood and appreciated that the illustration of FIG. 4A is only exemplary and other activation methods or renderings could be used via a webpage or a web driven plug-in application as desired or appropriate. As shown in FIG. 4B, once a user has completed the wireless transactions by which they desire to protect, the user can terminate the tunnel by selecting the "Terminate Tunnel" checkbox from the example page 404 shown in FIG. 4B. It is to be understood and appreciated that other variations of this user interface 404 could also be deployed as a way to terminate an SSL tunnel between a wireless device and WGD.

Figure 5:
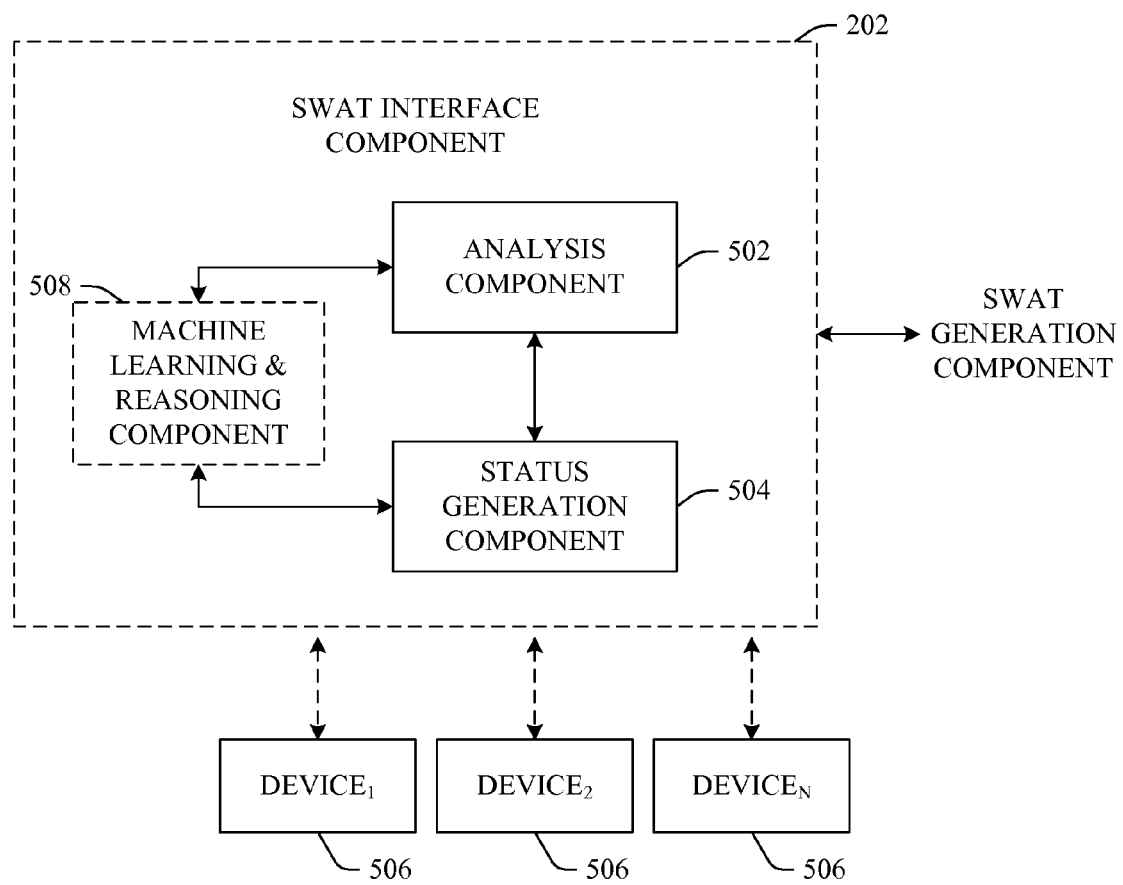
FIG. 5 illustrates an example block diagram of a SWAT interface component in accordance with an aspect of the innovation.

Referring now to FIG. 5, a block diagram of a SWAT interface component 202 is shown. Generally, the interface component 202 can include an analysis component 502 and a status generation component 504. Together, these sub-components 502, 504 detect traffic by which a tunnel can be created within the AP. Here, the analysis component 502 evaluates the traffic to determine if a tunnel should be created or offered to be created. It will be understood that traffic transmitted between device(s) 506 and the SWAT interface component 202 can be evaluated based upon type, content, origination location, target location/resource, context (date, time, activity), etc. This criteria can be employed to automatically establish a tunnel or to generate a splash screen by which a user can opt to generate a tunnel. In aspects, user policies, preferences, rules, etc. can be employed to automatically establish a tunnel. In other aspects, a desire to establish a tunnel can be inferred, e.g., by way of MLR component 508 in view of the analysis result.

It is to be understood that the innovation can be employed in connection with 1 to N wireless devices as shown, where N is an integer. These devices 506 can be the of the same or disparate types, including, but not limited to, PDAs, cell phones, smartphones, laptops, PCs or the like.

The status generation component 504 is capable of establishing state (e.g., no tunnel or tunnel active). In accordance with the state, the component 504 can establish and render an appropriate splash screen, for example, as illustrated in FIGS. 4A and 4B. As described above, these input screens enable a user to control whether or not to employ a secure tunnel (e.g., SSL) when accessing network resources by way of an AP, router or switch.

With continued reference to FIG. 5, the interface component 202 can employ an MLR component 508 which facilitates automating one or more features in accordance with the subject innovation. The subject innovation (e.g., activating and/or deactivating a secure tunnel) can employ various MLR-based schemes for carrying out various aspects thereof. For example, a process for determining when or if to trigger an SSL tunnel can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when or if to activate or deactivate a secure tunnel (e.g., SSL). The determination can be based upon most any criteria including but not limited to, user's historical decisions, other's decisions in similar scenarios, data type, origination location, target resource, context (e.g., date, time, activity), etc.

Figure 6:
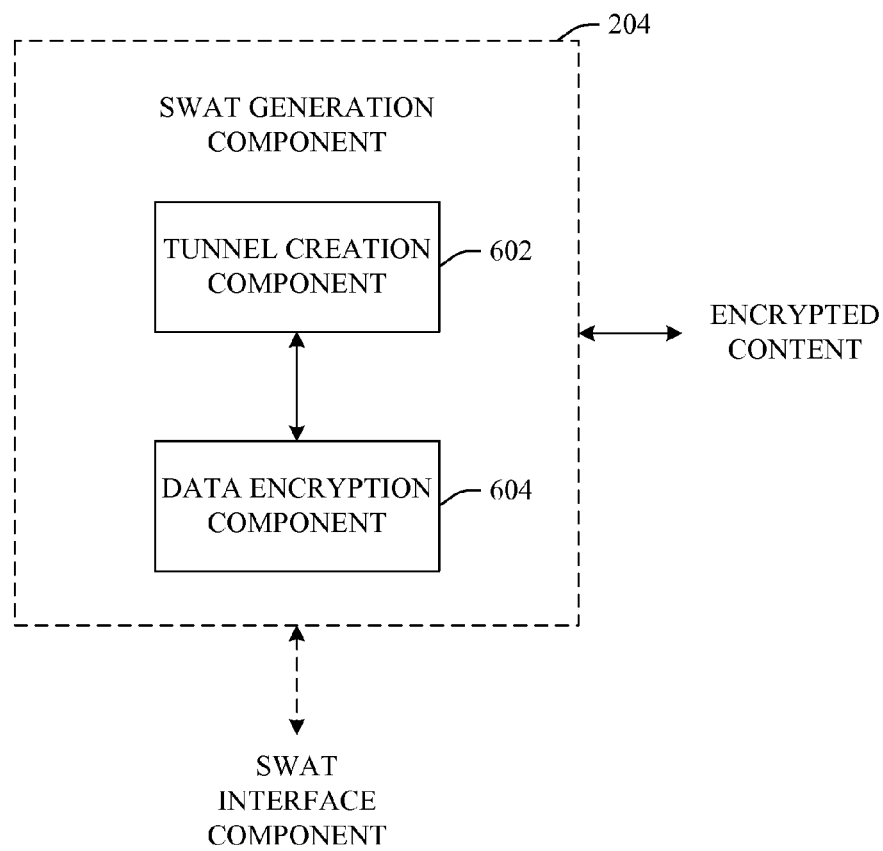
FIG. 6 illustrates an example SWAT generation component in accordance with an aspect of the innovation.

Referring now to FIG. 6, a block diagram of a SWAT generation component 204 is shown in accordance with an aspect of the innovation. Generally, the generation component 204 can include a tunnel creation component 602 and a data encryption component 604. Together, these sub-components (602, 604) facilitate communication of encrypted data traffic across a secure tunnel, such as an SSL tunnel. In aspects, the WGD (102 of FIG. 1) can be loaded or otherwise equipped with a signed certificate, for example, from a trusted certificate authority. The certificate can be used to encrypt the traffic from a wireless device (e.g., device(s) 106) to the WGD. In operation, when a user opens a browser, the browser can detect and inform the user that an AP or wireless LAN with SWAT active (or available) is present. This notification can be prompted by detection of the SWAT-equipped AP as described herein. Once detected, the user can be given an opportunity to activate or bypass the secure tunneling functionality. The opportunity can be conveyed by way of a splash screen as illustrated in FIG. 4A described supra.

In a particular aspect, the SSL tunnel is effected via port 443. It will be appreciated that port 443 can also be used to secure online transactions. Once the tunnel is established, all traffic is logically routed through the tunnel similar to an IPSec (IPSecurity) tunneling mechanism.

It will be appreciated that IPSec includes a set of protocols to support secure exchange of data packets at the IP layer. Today, IPSec is most often employed to implement VPNs or virtual private networks. IPSec supports "Transport" and "Tunnel" encryption modes. Transport mode encrypts only the payload or data portion of each packet. Here, the header of the packet is not employed. On the other hand, a more secure "Tunnel" mode encrypts both the payload and the header of each packet. On the receiving side, each packet can be decrypted by an IPSec-compliant device. In operation, both the sending and receiving devices share cryptographic keying material, e.g., a public key.

It will be appreciated that, conventionally, a user would need to configure secure wireless connections via complex configurations. In addition, with many of the traditional secure protocols, e.g., WEP, the implementation was optional. Unlike conventional approaches, the innovation described herein provides a simple, easy to implement secure wireless connection between the wireless device 106 and the WGD (e.g., SWAT-equipped AP 102). The activation of an SSL tunnel through the WGD or other network device such as a switch or router enables for a simple, secure connection that leverages a standard application (e.g., web browser application) without any user configurations.

Figure 7:
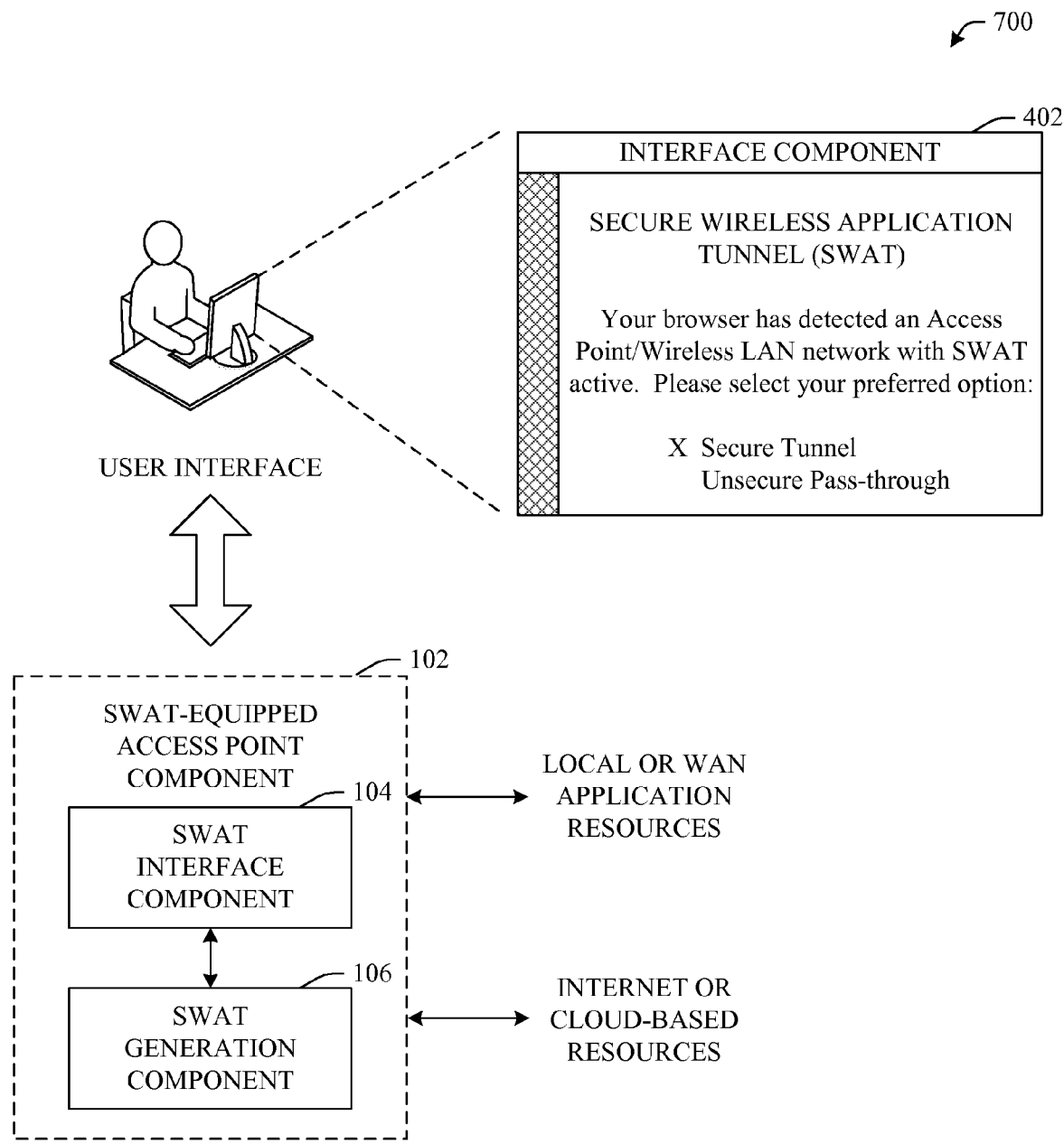
FIG. 7 illustrates an example system that effects secure wireless communication in accordance with an aspect of the innovation.

Referring now to FIG. 7, an alternative block diagram of a system 700 in accordance with an aspect of the innovation is shown. The system 700 provides a mechanism that deploys an AP or an integrated router/AP with embedded tunneling capabilities, such as SSL tunneling capabilities. As described herein, the innovation enables users to initiate secure SSL tunnels between a wireless computer or device that utilizes a browser session and the WGD or AP 102.

One benefit of system 700 is a secure connection from the WGD 102 to the wireless device without complexity to the user. Most any device (e.g., PC, PDA, laptop computer, cell phone, smartphone, etc.) with a web browser could be used to securely access the Internet or other desired network without increasing processing/application overhead or complexity to the user. The system 700 of FIG. 7 illustrates one mechanism by which a user can communicate with the SWAT-equipped AP 102 in order to trigger secure tunnel transmission. It is to be understood that this example is provided to add perspective to the innovation and is not intended to limit the innovation in any manner.

Figure 8:
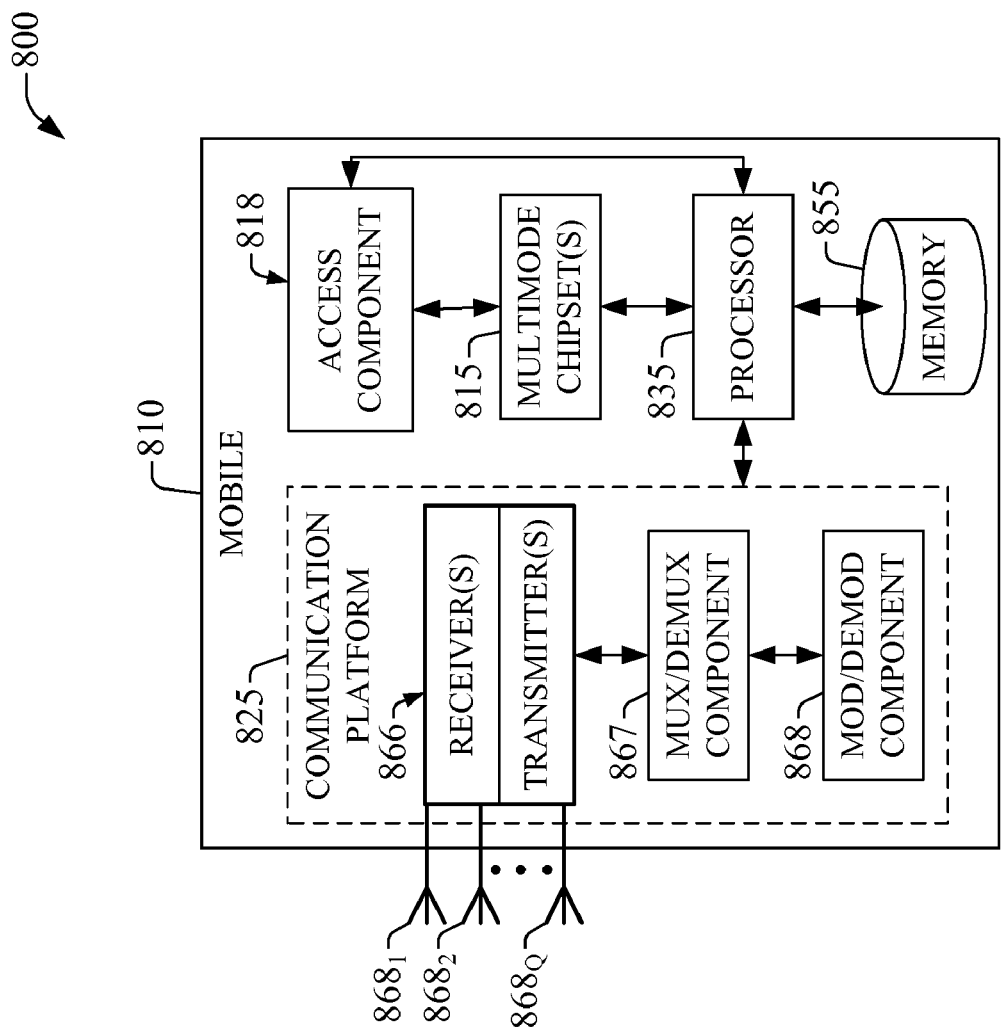
FIG. 8 is a schematic block diagram illustrating a suitable mobile operating environment for aspects of the subject disclosure.
Figure 9:
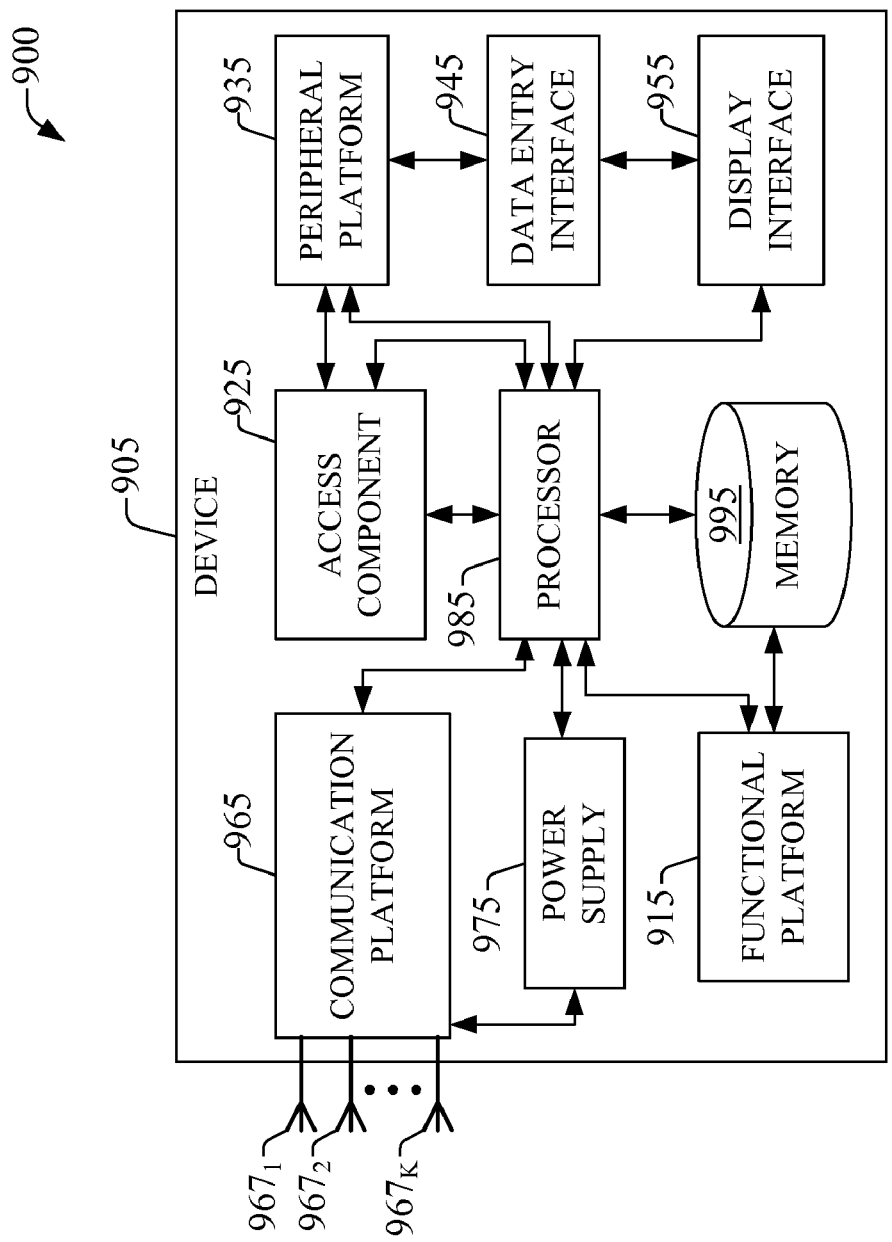
FIG. 9 is a schematic block diagram illustrating a suitable non-mobile operating environment for aspects of the subject disclosure.
Figure 10:
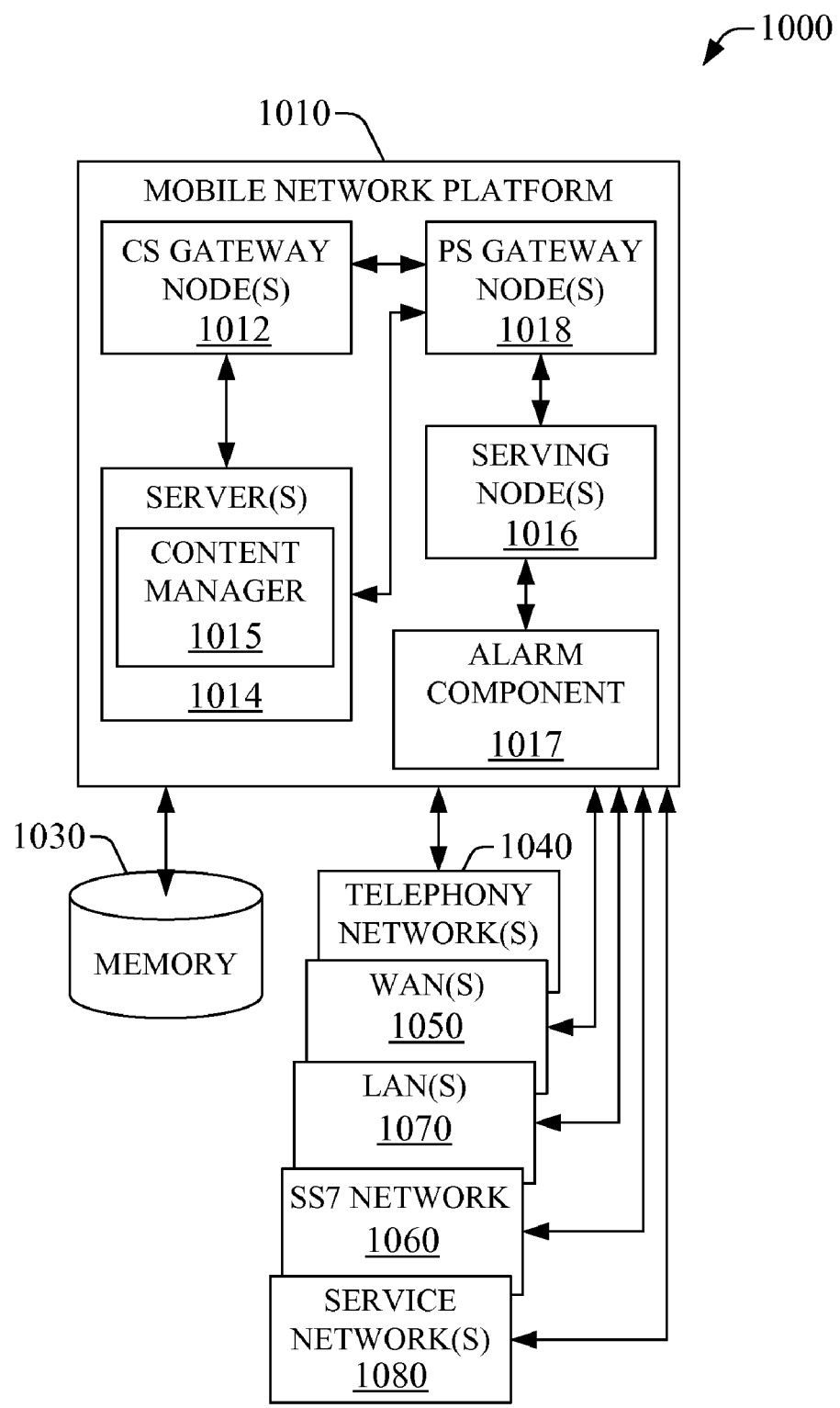
FIG. 10 is a schematic block diagram of a sample mobile network platform for aspects of the disclosed subject matter.

In order to provide a context for the various aspects of the disclosed subject matter, FIGS. 8-10 as well as the following discussion are intended to provide a brief, general description of suitable environments in which the various aspects of the disclosed subject matter can be implemented. FIG. 8 illustrates a block diagram of an example embodiment of a mobile device 810 that can be employed with respect to secure communications in accordance with aspects described herein. FIG. 9 presents a block diagram of an example embodiment of a non-mobile device 905, which can be provisioned through a non-mobile network platform and employed in accordance with aspects described herein. Further, FIG. 10 presents an exemplary embodiment of a mobile network platform 1010 that can provide secure communications in accordance with aspects described herein.

Mobile device 810, which can be a multimode access terminal, includes a set of antennas $868_1$-$868_Q$ (Q is a positive integer) that can receive and transmit signal(s) to and from wireless devices like access points, access terminals, wireless ports and routers, and so forth, which operate in a radio access network. It should be appreciated that antennas $868_1$-$868_Q$ are a part of communication platform 825, which comprises electronic components and associated circuitry that provide for processing and manipulation of received signal(s) and signal(s) to be transmitted such as receivers and transmitters 866, mux/demux component 867, and mod/demod component 868.

Multimode operation chipset(s) 815 allows mobile device 810 to operate in multiple communication modes in accordance with disparate technical specification for wireless technologies. In accordance with one aspect, multimode operation chipset(s) 815 utilize communication platform 825 in accordance with a specific mode of operation (e.g., voice, Global Positioning System (GPS)). In another aspect, multimode operation chipset(s) 815 can be scheduled to operate concurrently (e.g., when Q>1) in various modes or within a multitask paradigm.

Mobile device 810 includes access component 818 that can convey content(s) or signaling in accordance with disclosed aspects. It should be appreciated that access component 818, can include a display interface that renders content in accordance with aspects of an interface component (not shown) that resides within access component 818.

Mobile device 810 also includes a processor 835 configured to confer functionality, at least in part, to substantially any electronic component within mobile device 810, in accordance with aspects of the disclosure. As an example, processor 835 can be configured to execute, at least in part, instructions in multimode operation chipset(s) that afford secure communication through mobile device 810 such as SSL tunneling. Moreover, processor 835 enables mobile device 810 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 855 can store data structures (e.g., metadata); code structure(s) (e.g., modules, objects, classes, procedures . . . ) or instructions; network or device information like policies and specifications, attachment protocols; code sequences for scrambling, spreading and pilot (e.g., reference signal(s)) transmission; frequency offsets, cell IDs, and so on.

The processor 835 is functionally and/or communicatively coupled (e.g., through a memory bus) to memory 855 in order to store and retrieve information necessary to operate and/or confer functionality, at least in part, to communication platform 825, multimode operation chipset(s) 815, access component 818, and substantially any other operational aspects of multimode mobile 810.

FIG. 9 is a block diagram of an exemplary embodiment of a non-mobile device 905 that can convey secure communications. Device 905 includes a functional platform 915 that comprises a set of components (not shown) that provide, at least in part, one or more specific functionalities of the non-mobile device 905. Additionally, non-mobile device 905 includes an access component 925 that operates in accordance with aspects previously described (e.g., 818 of FIG. 8). Moreover, in one aspect, non-mobile device 905 can include a communication platform 965 that can provide wireless communication capabilities in addition, or alternatively, to connectivity of non-mobile device 905 through wired links (e.g., Ethernet, USB, GPIB, RS-232, FireWire, optical or coaxial cable connection to a network interface such as network interface, or router (not shown)).

With respect to wireless capability, in non-mobile device 905, which can be a multimode access terminal, a set of antennas $967_1$-$967_P$ (P is a positive integer) can receive and transmit signal(s) to and from wireless devices like access points, access terminals, wireless ports and routers, etc., that operate in a radio access network. Communication platform 965 can exploit the set of "P" antennas $967_1$-$967_K$, (K is a positive integer) to establish communication within various modes such as single-input single-output, or multiple-input multiple output. Furthermore, communication platform 965 can comprise various electronic components and associated circuitry that enable processing and manipulation of received signal(s) and signal(s) to be transmitted. In accordance with one aspect, the communication platform 965 can be embodied in a modem.

Non-mobile device 905 also includes a peripheral platform component 935 that can include, or facilitate connection to, additional devices such as printer(s), media player(s), wireless router(s) (e.g., network interface), biometrics touch-pad(s), etc. According to one aspect, to afford such connectivity, peripheral component 935 can include jacks for one or more of Ethernet, USB, GPIB, RS-232, FireWire, optical or coaxial cable connectors.

Display interface 955 can enable rendering of content. In an aspect, display interface 955 can be a liquid crystal display (LCD), a plasma panel, a monolithic thin-film based electrochromic display, amongst others. Additionally, display interface 955 can be a part of functional platform 915 (e.g., when non-mobile device 905 is a PC, an IPTV interface, a mobile device, a back projector component, a data projector . . . ).

It should be appreciated that non-mobile device 905 also can include a data entry interface 945 that can allow an end user to (i) command non-mobile device 99 via configuration of functional platform 915, (ii) deliver content(s) or signaling in accordance with aspects described herein, or (iii) generate content(s) (e.g., images via a built-in camera) or directive(s), among other things.

Power supply 975 can power-up device 905 and substantially any component included thereon. It should be appreciated that alternative or additional embodiments of device 905 may not include power supply 975 but rather be powered via attachment to a conventional power grid.

The non-mobile device 905 includes processor 985 which can be communicatively and/or functionally coupled (e.g., through a memory bus) to memory 995 in order to store and retrieve information necessary to operate and/or confer functionality, at least in part, to access component 925, and substantially any component(s) thereon in accordance with aspects described herein; functional platform 915; communication platform 965 when non-mobile device 905 includes it; and substantially any other component of non-mobile device 905.

With respect to access component 925, and components thereon, processor 985 can be configured to execute access protocols to convey credentials and gain access to a content management service to convey multimedia content(s) or signaling, among other things. In addition, in connection with communication platform 965, processor 985 can be configured to confer functionality to substantially any electronic component within communication platform 965. Moreover, processor 985 enables communication platform 965 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 995 can retain multimedia content(s), in accordance with aspects of the subject innovation, or security credentials (e.g., passwords, encryption keys, digital certificates . . . ) that facilitate access to a content management service. In addition, memory 995 can store data structures (e.g., metadata); code structure(s) (e.g., modules, objects, classes, procedures . . . ) or instructions, or substantially any type of software or firmware that processor 985 can execute to provide functionality associated with functional platform 915; network or device information like policies and specifications; code sequences for scrambling, spreading and pilot (e.g., reference signal(s)) transmission; amongst others.

As indicated supra, FIG. 10 presents an example embodiment of a mobile network platform 1010 that can provide a content management service for content(s) and signaling in accordance with aspects described herein. Generally, mobile network platform 1010 can include components, such as, nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In accordance with one aspect, a component within a PS domain of network platform 1010 can be employed to effect communication among sources of content(s) in accordance with aspects described herein.

With respect to CS communication, mobile network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway node(s) 1012 can authorize and authenticate traffic (e.g., voice) arising from such networks. Additionally, CS gateway node(s) 1012 can access mobility, or roaming, data generated through SS7 network 1060; for instance, mobility data stored in a visitation location register (VLR), which can reside in memory 1030. Moreover, CS gateway node(s) 1012 interfaces CS-based traffic and signaling and gateway node(s) 1018. As an example, in a 3GPP UMTS network, CS gateway node(s) 1012 can be embodied, at least in part, in gateway GPRS support node(s) (GGSN).

In addition to receiving and processing CS-switched traffic and signaling, PS gateway node(s) 1018 can authorize and authenticate PS-based data sessions with served mobile devices, non-mobile devices, amongst others through access points or the like. Data sessions can include traffic, or content(s), exchange with networks external to the mobile network platform 1010, like wide area network(s) (WANs) 1050 or service network(s) 1080; it should be appreciated that local area network(s) (LANs) 1070 can also be interfaced with mobile network platform 1010 through PS gateway node(s) 1018.

Packet-switched gateway node(s) 1018 generate packet data contexts when a data session is established. To that end, in an aspect, PS gateway node(s) 1018 can include a tunnel interface (e.g., tunnel termination gateway (TTG) in 3GPP UMTS network(s) (not shown)) which can facilitate packetized communication with different wireless network(s), such as femto network platform and associated radio access network, Wi-Fi networks. It should be further appreciated that the packetized communication can include multiple flows that can be generated through service (e.g., provisioning) and application server(s) 1014. It is to be noted that in 3GPP UMTS network(s), PS gateway node(s) 1018 (e.g., GGSN) and tunnel interface (e.g., TTG) comprise a packet data gateway (PDG).

The mobile network platform 1010 also includes serving node(s) 1016 that convey various packetized flows of data streams, received through PS gateway node(s) 1018. As an example, in a 3GPP UMTS network, serving node(s) 1016 can be embodied in serving GPRS support node(s) (SGSN).

Server(s) 1014 in mobile network platform 1010 can execute numerous applications (e.g., location services, online gaming, wireless banking, wireless device management . . . ) that can generate multiple different packetized data streams or flows, and manage (e.g., schedule, queue, format . . . ) such flows. Such application(s), for example, can include add-on features to standard services provided by mobile network platform 1010. Data streams can be conveyed to PS gateway node(s) 1018 for authorization/authentication and initiation of a data session, and to serving node(s) 1016 for communication thereafter. It should be appreciated that PS gateway node(s) 1018 associated with a macro network platform can authorize, or grant access, to content management service, and PS gateway node(s) 1018 associated with a femto network platform can carry out communication with serving node(s) 1016 related to a femto network platform.

Server(s) 1014 can also effect security (e.g., implement one or more firewalls) of mobile network platform 1010 to ensure network's operation and data integrity in addition to authorization and authentication procedures that CS gateway node(s) 1012 and PS gateway node(s) 1018 can enact. Moreover, server(s) 1014 can provision services from external network(s), such as WAN 1050 or Global Positioning System (GPS) network(s) (not shown). It is to be noted that server(s) 1014 can include one or more processors configured to confer at least in part the functionality of macro network platform 1010. To that end, the one or more processors can execute code instructions stored in memory 1030, for example. It is should be appreciated that server(s) 1014 can include a content manager 1015, that provides content management service. To at least that end, content manager 1015 includes issues subscription(s) to the content management service.

Memory 1030 can store information related to operation of mobile network platform 1010. Information can include content(s) received from various sources of content(s), subscriber account(s) and associated credential(s), and delivery settings(s), additional subscriber data; pricing schemes, such as promotional rates, flat-rate programs, and/or couponing campaigns, amongst others. Memory 1030 can also store information from at least one of telephony network(s) 1040, WAN 1050, LAN 1070, SS7 network 1060, or service network(s) 1080.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a secure wireless application tunnel-equipped access point device including a secure wireless application tunnel interface component that includes an analysis component that detects connectivity of a mobile device to the secure wireless application tunnel-equipped access point device, and a status generation component that renders an interface of the mobile device based on detection of the connectivity and renders a selection option that includes a secure tunnel selection and an unsecure pass-through transmission selection with the interface through a web browser of the mobile device; and
a secure wireless application tunnel generation component that establishes the secure tunnel that secures communications between the mobile device and the secure wireless application tunnel-equipped access point device,
wherein the secure wireless application tunnel interface component receives a user selection to employ the secure tunnel with the secure wireless application tunnel generation component to wirelessly access resources.

2. The system of claim 1, wherein the secure tunnel employs a secure socket layer communications protocol.

3. The system of claim 1, wherein the status generation component prompts the secure tunnel selection and the unsecure pass-through transmission selection, with the interface through the web browser of the mobile device.

4. The system of claim 1, further comprising:
a router that extends the secure tunnel to pass through the secure wireless application tunnel-equipped access point device and extend between the mobile device and the router,
wherein the interface component renders an option to terminate transmission and an option to continue transmission via the secure tunnel, and the router terminates the transmission.

5. The system of claim 1, wherein the resources are network resources.

6. The system of claim 1, wherein the secure wireless application tunnel interface component comprises a machine learning and reasoning component that employs an analysis that infers an action to be automatically performed based on criteria including content, origination location, target location, and context.

7. The system of claim 1,
wherein the analysis component determines whether the secure tunnel is to be automatically created with the interface to the mobile device, based on an evaluation of the traffic of the mobile device.

8. The system of claim 1, wherein the secure wireless application tunnel generation component includes a tunnel creation component that establishes the secure tunnel for communications between the mobile device and the secure wireless application tunnel-equipped access point device, wherein the secure tunnel is a secure socket layer tunnel.

9. The system of claim 8, wherein the secure wireless application tunnel generation component further includes a data encryption component that encrypts data for transmission within the secure tunnel and the secure wireless application tunnel interface component evaluates traffic of multiple mobile devices to detect the traffic by which the secure tunnel is to be established.

10. A computer-implemented method, comprising:
detecting, at a secure wireless access point device, connectivity of a mobile device to the secure wireless application tunnel-equipped access point device;
rendering, with a status generation component of the secure wireless application tunnel-equipped access point device, an interface of the mobile device based on the detected connectivity including rendering a selection option that includes a secure tunnel selection and an unsecure pass-through transmission selection with the interface through a web browser of the mobile device;
receiving a user selection to employ a secure tunnel with the secure wireless application tunnel generation component to wirelessly access resources; and
establishing the secure tunnel between the mobile device and the secure wireless application tunnel-equipped access point device.

11. The computer-implemented method of claim 10, further comprising:
determining whether to employ the secure tunnel based on the user selection received at the interface.

12. The computer-implemented method of claim 11, further comprising:
employing a statistical-based analysis with a machine learning and reasoning component that infers an action to be automatically performed based on criteria including content, origination location, target location and context.

13. The computer-implemented method of claim 12, further comprising:
decrypting the traffic for presentation to a local area network.

14. The computer-implemented method of claim 13, further comprising:
forwarding decrypted traffic to an internet protocol address.

15. The computer-implemented method of claim 10, further comprising:
extending the secure tunnel through the secure wireless application tunnel-equipped access point device to a router;
receiving encrypted traffic from the mobile device across the secure tunnel;
decrypting the traffic for presentation to a local area network;
forwarding decrypted traffic to a network address; and
terminating transmission with the router in response to an option to terminate that is received from the interface.

16. A secure wireless application tunnel equipped access point device having a processor that includes:
a secure wireless application tunnel interface component, execution of which is facilitated by the processor, including:
an analysis component that detects connectivity of a mobile device to the secure wireless application tunnel-equipped access point device; and
a status generation component that renders an interface of the mobile device based on the detected connectivity and a selection option that includes a secure tunnel selection and an unsecure pass-through transmission selection with the interface through a web browser of the mobile device; and
a secure wireless application tunnel generation component that establishes a secure tunnel that secures communications between the mobile device and the secure wireless application tunnel-equipped access point device,
wherein the secure wireless application tunnel interface component receives a user selection to employ the secure tunnel with the secure wireless application tunnel generation component to wirelessly access resources.

17. The device of claim 16, wherein the interface is rendered with only the selection option that is associated with the secure tunnel between the mobile device and the secure wireless application tunnel-equipped access point device.

18. The device of claim 16, wherein the secure wireless application tunnel interface component includes a machine learning and reasoning component that employs a probabilistic analysis that infers an action to be automatically performed based on criteria including content, origination location, target location, and context.

19. The device of claim 16, wherein the analysis component determines whether the secure tunnel is to be created with the interface to the mobile device, based on an evaluation of the traffic of the mobile device.

20. The device of claim 16, wherein the secure wireless application tunnel generation component includes a tunnel creation component that establishes the secure tunnel for communications between the mobile device and the secure wireless application tunnel-equipped access point device, wherein the secure tunnel is a secure socket layer tunnel.

* * * * *